(12) United States Patent
Manga et al.

(10) Patent No.: US 9,370,985 B2
(45) Date of Patent: Jun. 21, 2016

(54) PISTON WITH CRUSH FINS

(71) Applicant: Continental Automotive Systems, Inc., Auburn Hills, MI (US)

(72) Inventors: Kranti Kiran Manga, Rochester Hills, MI (US); Garrett Mark Pniewski, Bloomfield Hills, MI (US); David Lee Hockey, Rochester Hills, MI (US); Christian Schallmeier, Lake Orion, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/602,668

(22) Filed: Jan. 22, 2015

(65) Prior Publication Data

US 2015/0202938 A1 Jul. 23, 2015

Related U.S. Application Data

(60) Provisional application No. 61/930,044, filed on Jan. 22, 2014.

(51) Int. Cl.
*F16F 9/04* (2006.01)
*B60G 15/12* (2006.01)
*B60G 11/27* (2006.01)

(52) U.S. Cl.
CPC .............. *B60G 15/12* (2013.01); *B60G 11/27* (2013.01); *F16F 9/0454* (2013.01); *B60G 2202/152* (2013.01); *Y10T 29/49945* (2015.01)

(58) Field of Classification Search
CPC ........ B60G 11/27; B60G 11/28; B60G 15/00; B60G 15/12; B60G 13/006; B60G 13/003; B60G 2202/32; B60G 2202/152; B60G 2206/82092; B60G 2206/8103; A47C 3/30; F16F 9/0454; Y10T 29/49945
USPC ........ 267/64.23, 64.19, 64.15, 121, 219, 220, 267/292–294; 188/322.12, 321.11, 300; 248/132, 161, 404, 414, 418; 297/344.19
See application file for complete search history.

(56) References Cited

U.S. PATENT DOCUMENTS

| | | | | | |
|---|---|---|---|---|---|
| 2,925,263 | A | * | 2/1960 | Blythe | B60G 15/00 267/219 |
| 4,817,928 | A | * | 4/1989 | Paton | B60G 13/006 267/219 |
| 5,120,031 | A | * | 6/1992 | Charles | B60G 13/003 267/220 |
| 5,556,170 | A | * | 9/1996 | Lai | A47C 3/30 297/344.19 |
| 6,474,619 | B1 | * | 11/2002 | Ma | A47B 9/20 248/132 |
| 6,866,238 | B2 | * | 3/2005 | Enders | A47C 3/30 248/161 |
| 2003/0160367 | A1 | * | 8/2003 | Klitsch | B60G 15/12 267/64.23 |

* cited by examiner

*Primary Examiner* — Pamela Rodriguez

(57) ABSTRACT

An air spring for air suspension system comprises a piston assembly and a damper assembly. A plurality of crush ribs are spaced apart from one another located within an internal cavity defined by the piston assembly and extending in an axial direction. A striker cap is located proximate to a first end of the damper assembly. There is a first interference fit between the damper assembly and the striker cap and there is a second interference fit between the striker cap and the crush fins, such that the piston assembly and the damper assembly are rotationally fixed relative to one another.

6 Claims, 2 Drawing Sheets

PISTON WITH CRUSH FINS

CROSS-REFERENCE TO RELATED APPLICATIONS

This disclosure claims priority to U.S. Provisional Application No. 61/930,044, which was filed on Jan. 22, 2014 and is incorporated herein by reference.

TECHNICAL FIELD

The present disclosure relates to automotive vehicles and more particularly to suspension systems for automotive vehicles.

BACKGROUND

Suspension systems for automotive vehicles provide vehicle passengers with a more comfortable ride. Air suspension systems utilize air springs, rather than traditional coil springs. Air suspension systems provide different suspension qualities that may be preferable in some vehicles to traditional coil spring suspensions.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An air spring for an air suspension system comprises a piston assembly and a damper assembly. A plurality of crush ribs are spaced apart from one another located within an internal cavity defined by the piston assembly and extending in an axial direction. A striker cap is located proximate to a first end of the damper assembly. There is a first interference fit between the damper assembly and the striker cap and there is a second interference fit between the striker cap and the crush fins, such that the piston assembly and the damper assembly are rotationally fixed relative to one another.

A method of assembling an air spring assembly for a vehicle comprises pressing a striker cap onto one end of a damper assembly and pressing the striker cap within a cavity defined by a piston assembly. The striker cap has an interference fit with a plurality of crush fins which are spaced apart and inwardly protruding from the piston assembly, such that the damper assembly and the piston assembly are rotationally fixed relative to one another.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
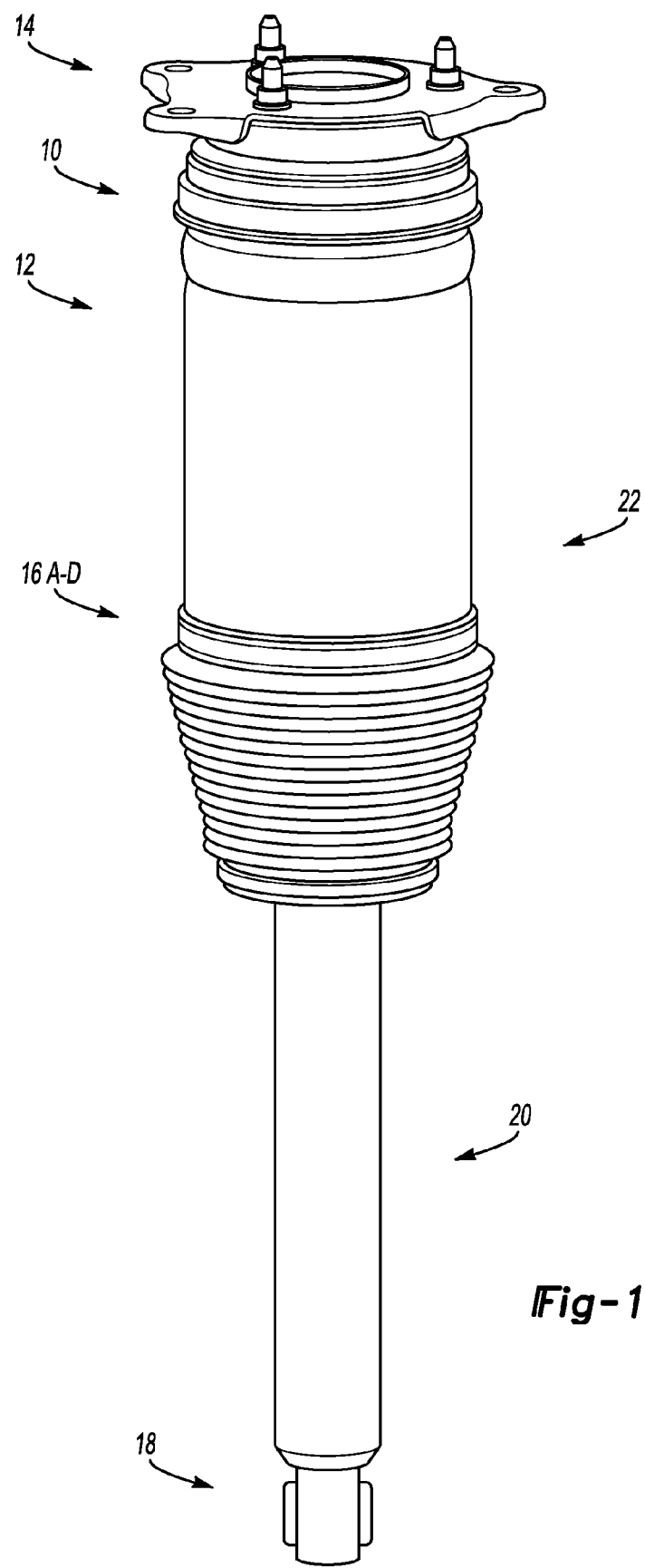
FIG. 1 is a schematic perspective illustration of one embodiment of a piston of the present invention.
Figure 2:
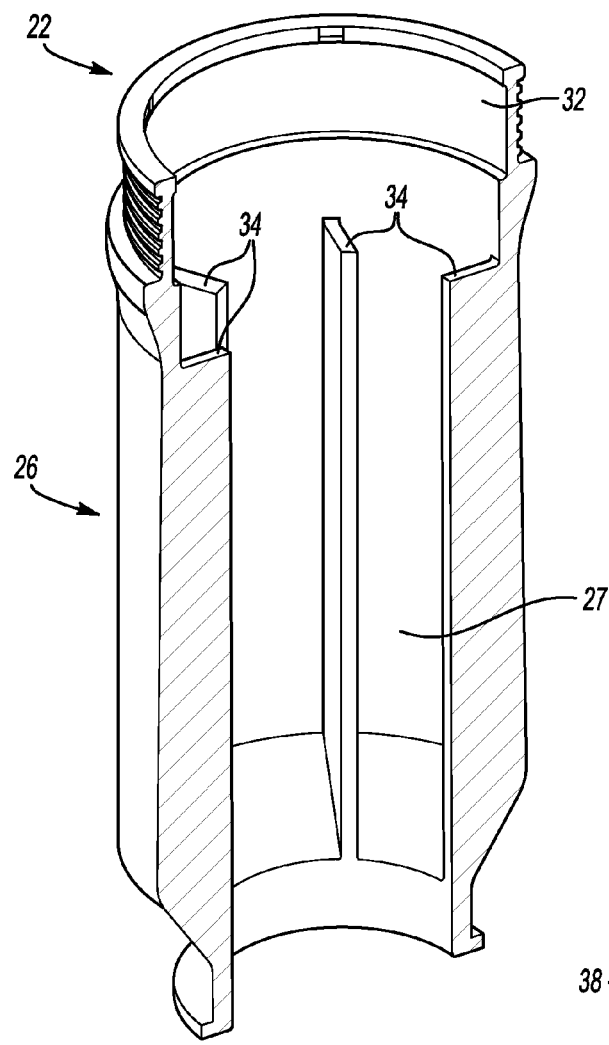
FIG. 2 is a schematic perspective illustration of a cross-section of the piston of the present invention.
Figure 3:
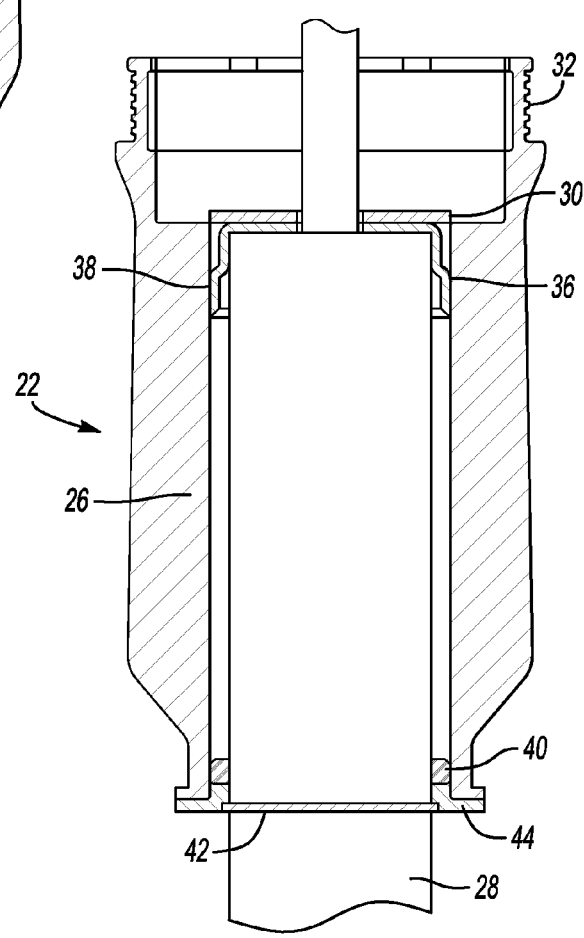
FIG. 3 is a schematic perspective illustration of another cross-section of the piston of the present invention

The following description is merely exemplary in nature and is in no way intended to limit the disclosure, its application, or uses. For purposes of clarity, the same reference numbers will be used in the drawings to identify similar elements. Referring to FIGS. 1-3 a vehicle 10 having an air suspension system 12 is supported between a frame 14 and the vehicle wheels 18. The air suspensions system has four assemblies 16A-D located at each of the wheels 18. The air suspension system 12 includes dampers (or shock absorbers) 20 and air springs 22. One damper assembly 20 and one air spring 22 is associated with each wheel assembly 18. The damper assembly 20 and the air springs 22 can be combined into one assembly. Alternatively, the air spring 22 and the damper assembly 20 may be separate components that are located proximate to each other.

In the embodiment shown, the air spring 22 includes a piston assembly 26 and the damper assembly 20. A portion of the piston assembly 26 is axially moveable relative to the damper assembly 20. A striker cap 30 is located at one end of the piston 26 and damper assembly 20. The striker cap 30 is manufactured from metal, which deforms due to the interference fit during assembly to the piston assembly 26 and the damper assembly 20.

The piston assembly 26, in this embodiment, is made of plastic material overmolded with a metal support ring 32. The walls of the piston 26 define an internal cavity 27, in which the damper 20 may be assembled. A plurality of crush fins or ribs 34 are spaced around the internal cavity 27 defined by the piston 26 and extend in the axial direction. The crush ribs 34 protrude inwardly from the wall of the piston 26 toward the center of the cavity 27. The crush ribs 34 may be evenly spaced from each other around the inner circumference of the piston wall. The number and spacing of the crush ribs may be determined by one skilled in the art for a particular air spring assembly 22.

The piston assembly 26 goes over the damper assembly 20, as shown in the FIGS. 1 and 3. At the top, the piston 26 and damper assembly 20 features two press fits, the first press fit 36 is located between the damper 20 and the striker cap 30 and the second press fit 38 is located between the striker cap 30 and the crush fins 34. These two press fits 36 and 38 help to orient and position the piston assembly 26 and the damper assembly 20 with respect to the strut assembly. A plastic support ring 44 which sits on a damper snap ring 42, as shown in FIG. 3, holds an O-ring 40 in order to seal the piston 26 and the damper 20 from any air leakages.

The second press fit 38 between the striker cap 30 and crush fins 34 helps in aligning the piston 26 and the damper assembly 20 with respect to the strut assembly. The press fits 36 and 38 align the piston 26 and the damper assembly 20 by preventing relative rotation between the piston 26 and the damper assembly 20.

The crush fins 34 may extend the length of the piston 26 and provide additional structural reinforcement of the piston walls. Alternatively, the crush 34 fins may have sufficient length for assembly of the piston 26 and the damper 20, but not extend the length of the piston 26, in order to reduce necessary material. One skilled in the art would be able to determine the size of the crush fins 34, including width, depth, and length, desired for a particular air spring 22.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. An air spring for an air suspension system comprising:
    a piston assembly and a damper assembly;
    a plurality of crush ribs spaced apart from one another located within an internal cavity defined by the piston assembly and extending in an axial direction;
    a striker cap located proximate to a first end of the damper assembly;
    wherein there is a first interference fit between the damper assembly and the striker cap and wherein there is a second interference fit between the striker cap and the crush fins such that the piston assembly and the damper assembly are rotationally fixed relative to one another;
    a damper snap ring located at a second end of the damper assembly;
    an o-ring to seal the piston and the damper assembly; and
    a support ring at a second end of the piston assembly to retain the o-ring.

2. The air spring of claim 1, further comprising a metal support ring at a first end of the piston assembly and wherein the piston assembly is plastic overmolded with the metal support ring.

3. The air spring of claim 1, wherein the plurality of crush fins extend the length of the piston assembly.

4. A method of assembling an air spring assembly for a vehicle comprising:
    pressing a striker cap onto one end of a damper assembly;
    pressing the striker cap within a cavity defined by a piston assembly, wherein the striker cap has an interference fit with a plurality of crush fins, which are spaced apart and inwardly protruding from the piston assembly, such that the damper assembly and the piston assembly are rotationally fixed relative to one another;
    wherein a damper snap ring is located at a second end of the damper assembly;
    sealing the piston and the damper assembly with an o-ring; and
    retaining the o-ring with a support ring at a second end of the piston assembly.

5. The method of claim 4, further comprising overmolding the piston assembly from plastic over the support ring at a first end of the piston assembly, wherein the support ring is metal.

6. The method of claim 4, wherein the plurality of crush fins extend the length of the piston assembly.

* * * * *